US010400745B2

United States Patent
Tobin et al.

(10) Patent No.: US 10,400,745 B2
(45) Date of Patent: Sep. 3, 2019

(54) ROTOR BLADE COMPONENTS HAVING VARYING FIBER DENSITY REGIONS

(71) Applicant: General Electric Company, Schenectady, NY (US)

(72) Inventors: James Robert Tobin, Simpsonville, SC (US); Christopher Daniel Caruso, Greenville, SC (US); Aaron A. Yarbrough, Greenville, SC (US); Daniel Alan Hynum, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1043 days.

(21) Appl. No.: 14/835,842

(22) Filed: Aug. 26, 2015

(65) Prior Publication Data

US 2017/0058861 A1    Mar. 2, 2017

(51) Int. Cl.
   *F03D 1/06*    (2006.01)
   *F03D 80/50*   (2016.01)

(52) U.S. Cl.
   CPC .......... *F03D 1/0675* (2013.01); *F03D 80/50* (2016.05); *F05B 2230/80* (2013.01); *Y02E 10/721* (2013.01); *Y02P 70/523* (2015.11)

(58) Field of Classification Search
   CPC ... B29C 65/0681; F03D 1/0675; F03D 80/50; F05B 2230/80; Y02E 10/721; Y02P 70/523
   USPC .......................................... 416/226; 156/73.5
   See application file for complete search history.

(56) References Cited

U.S. PATENT DOCUMENTS

| 7,507,310 B2 * | 3/2009 | Manicke | ............. B29C 65/0681 |
| | | | 156/73.5 |
| 7,879,421 B2 * | 2/2011 | Manicke | ............. B29C 65/0681 |
| | | | 428/57 |
| 2010/0062238 A1 * | 3/2010 | Doyle | ..................... B29C 70/02 |
| | | | 428/295.1 |

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.

* cited by examiner

*Primary Examiner* — Mark A Laurenzi
*Assistant Examiner* — Paul W Thiede
(74) *Attorney, Agent, or Firm* — Dority & Manning, P.A.

(57) ABSTRACT

A rotor blade for a wind turbine may generally include a first blade component formed from a first fiber-reinforced composite including a first thermoplastic resin material and a second blade component configured to be coupled to the first blade component at a joint interface. The second blade component may be formed from a second fiber-reinforced composite including a second thermoplastic resin material. The second fiber-reinforced composite may include a low fiber region and a high fiber region, with the low fiber region having a fiber-weight fraction that is less than a fiber-weight fraction of the high fiber region. In addition, the first thermoplastic resin material of the first fiber-reinforced composite may be welded to the second thermoplastic resin material contained within the low fiber region of the second thermoplastic composite to form a welded joint at the joint interface between the first blade component and the second blade component.

19 Claims, 10 Drawing Sheets

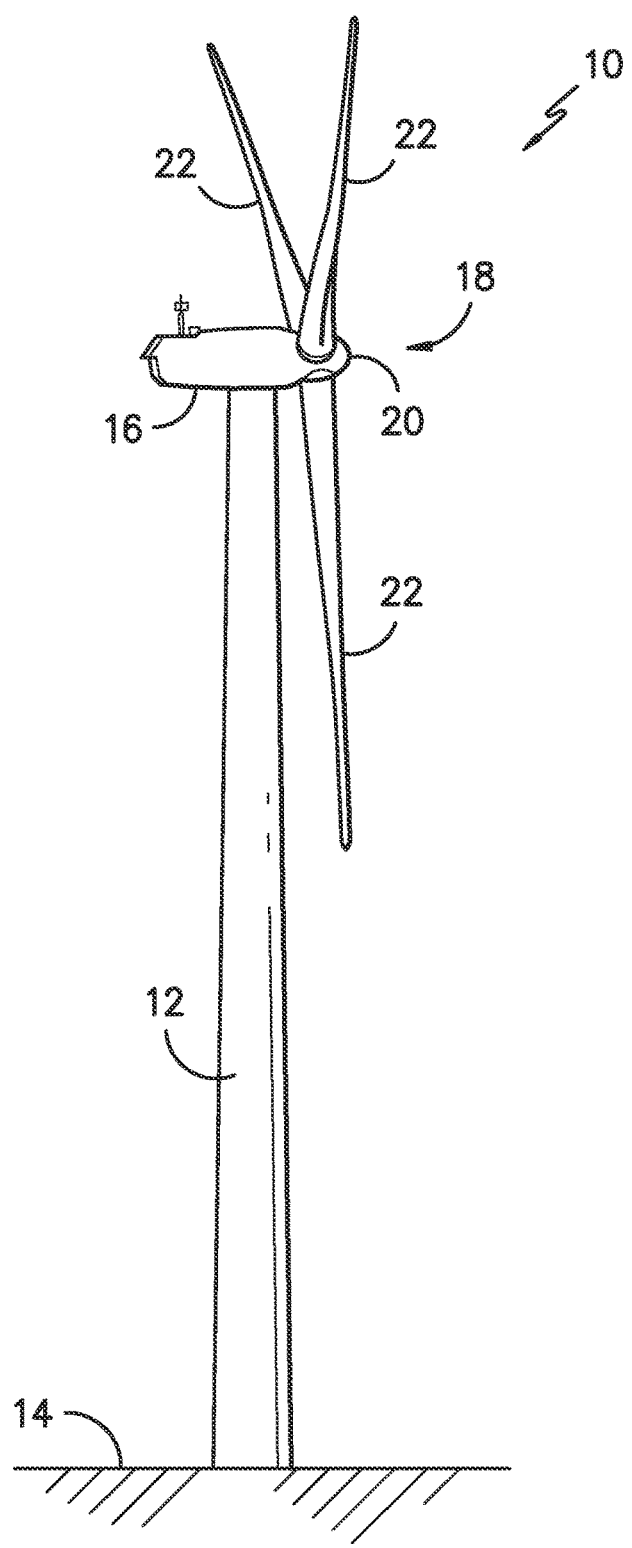
FIG. -1-

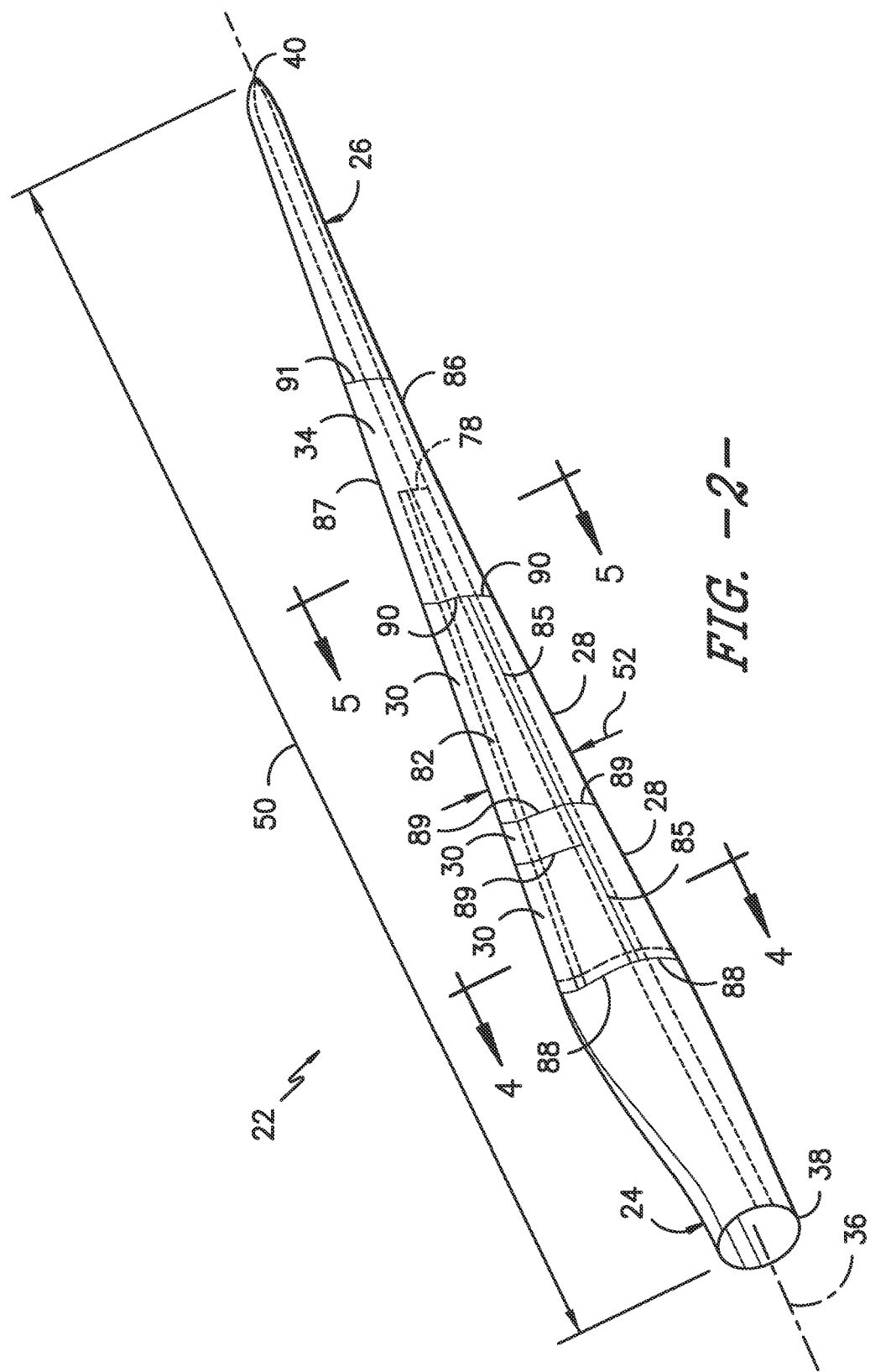
FIG. -2-

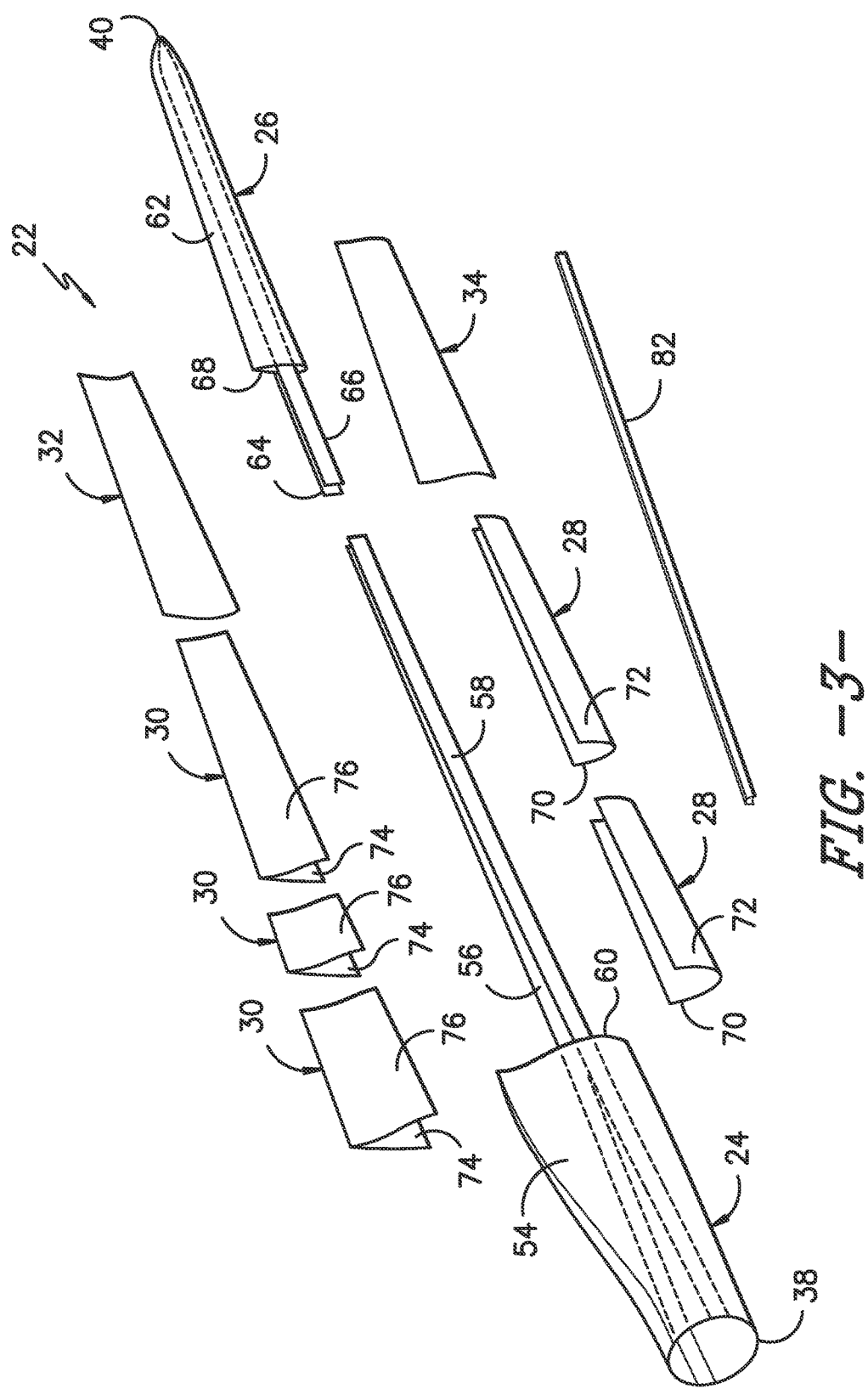
FIG. -3-

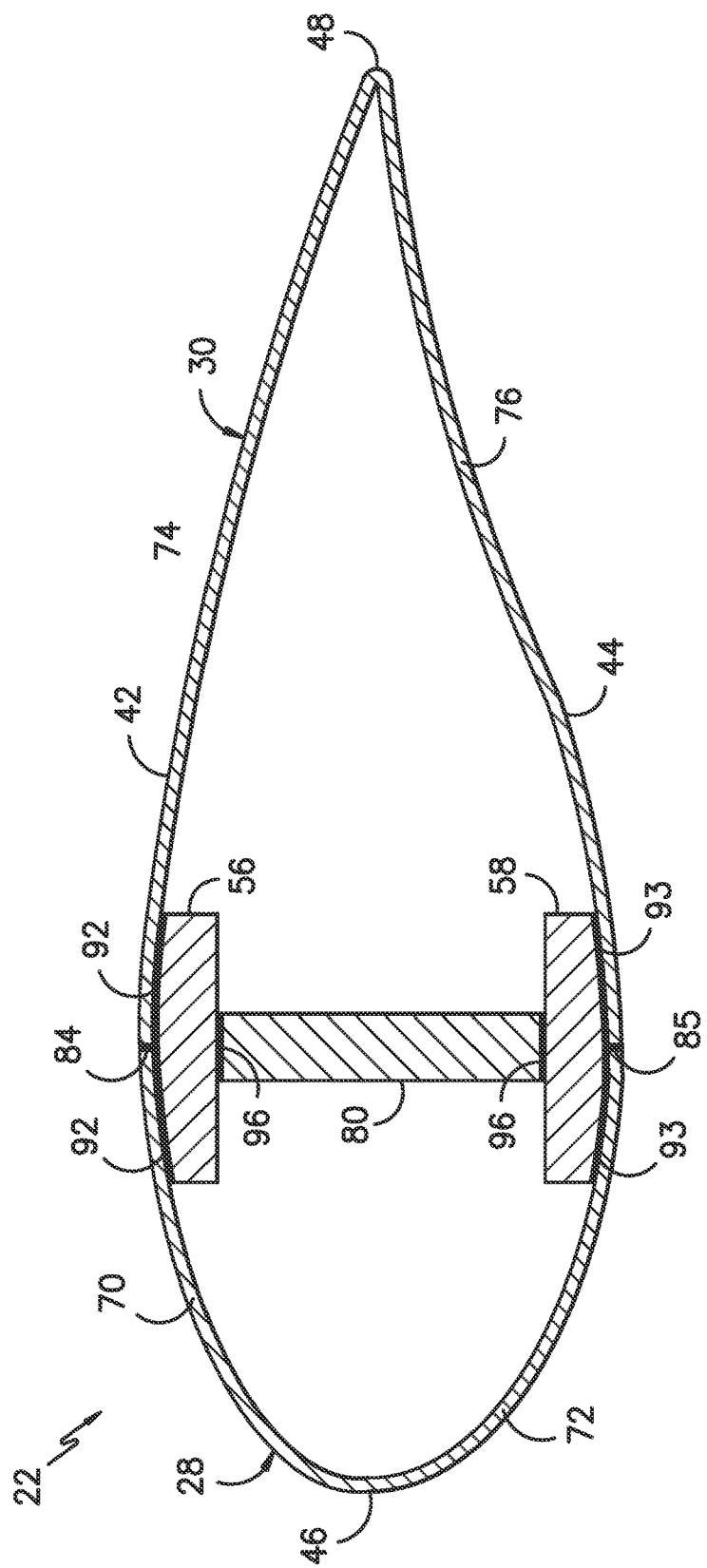
FIG. -4-

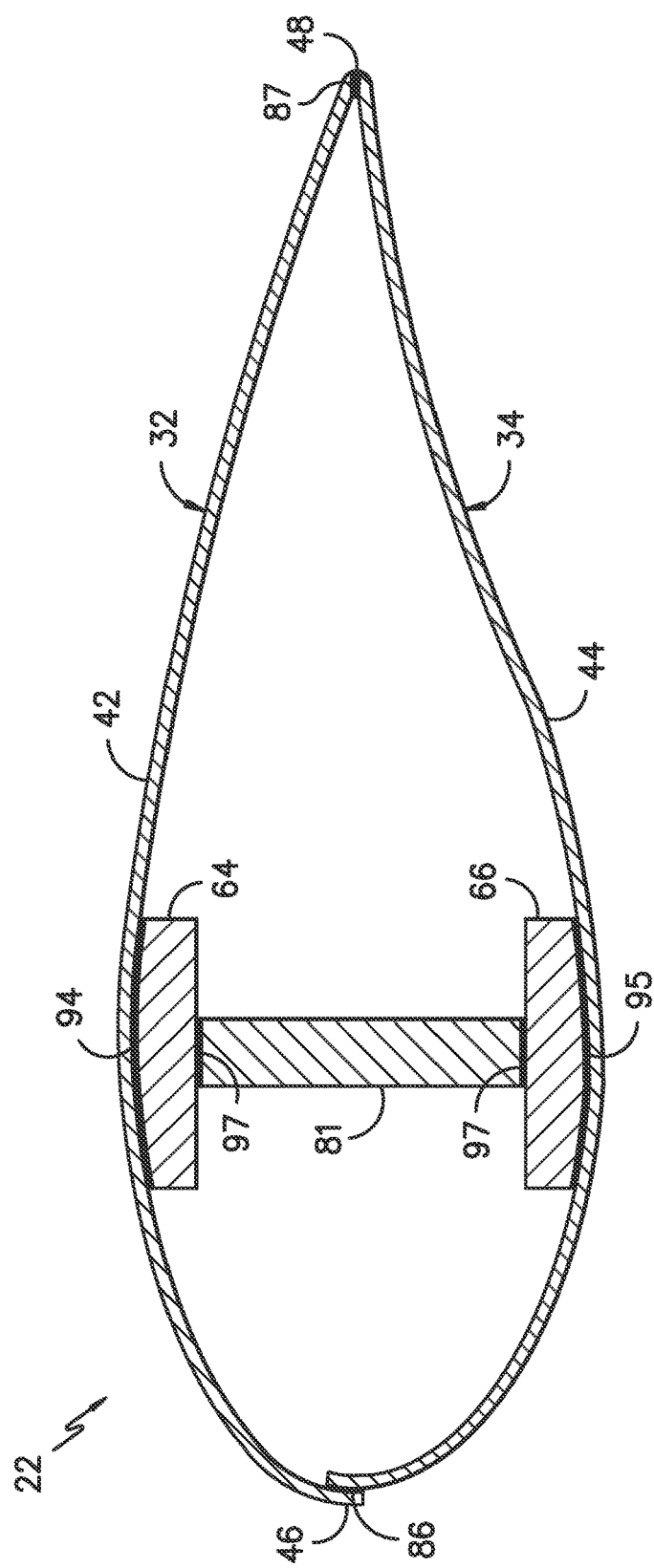
FIG. -5-

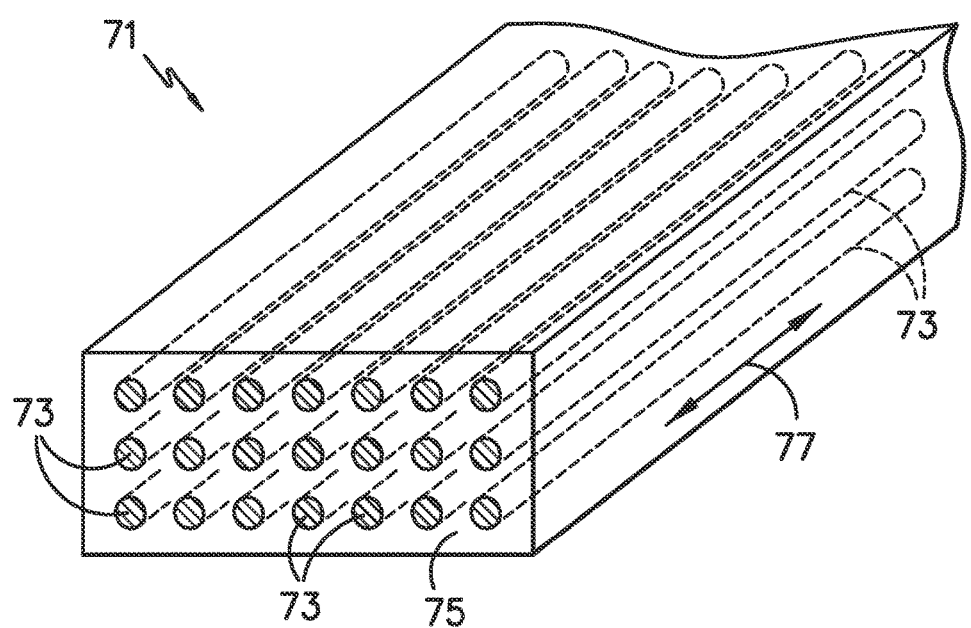
FIG. -6-

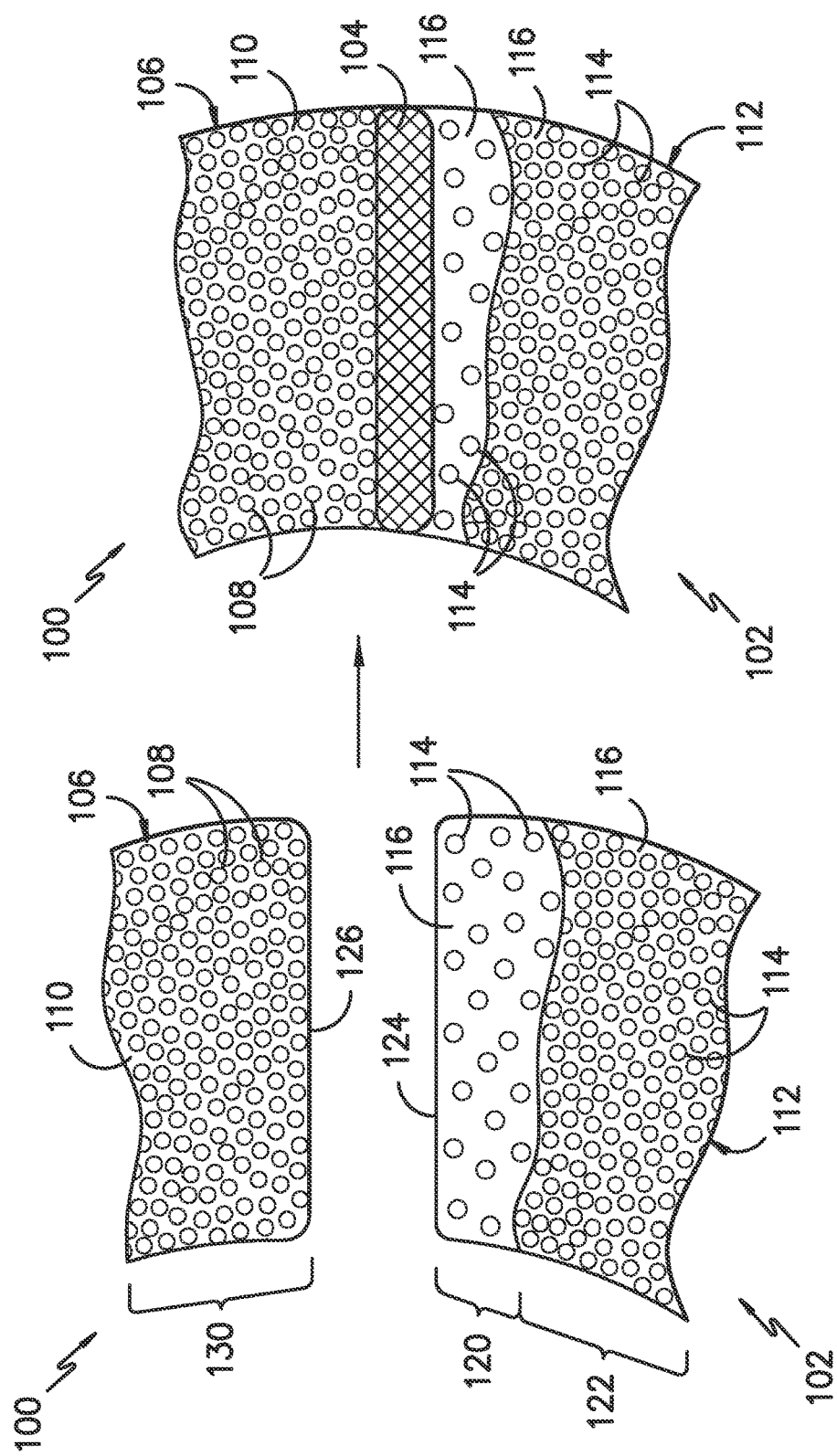

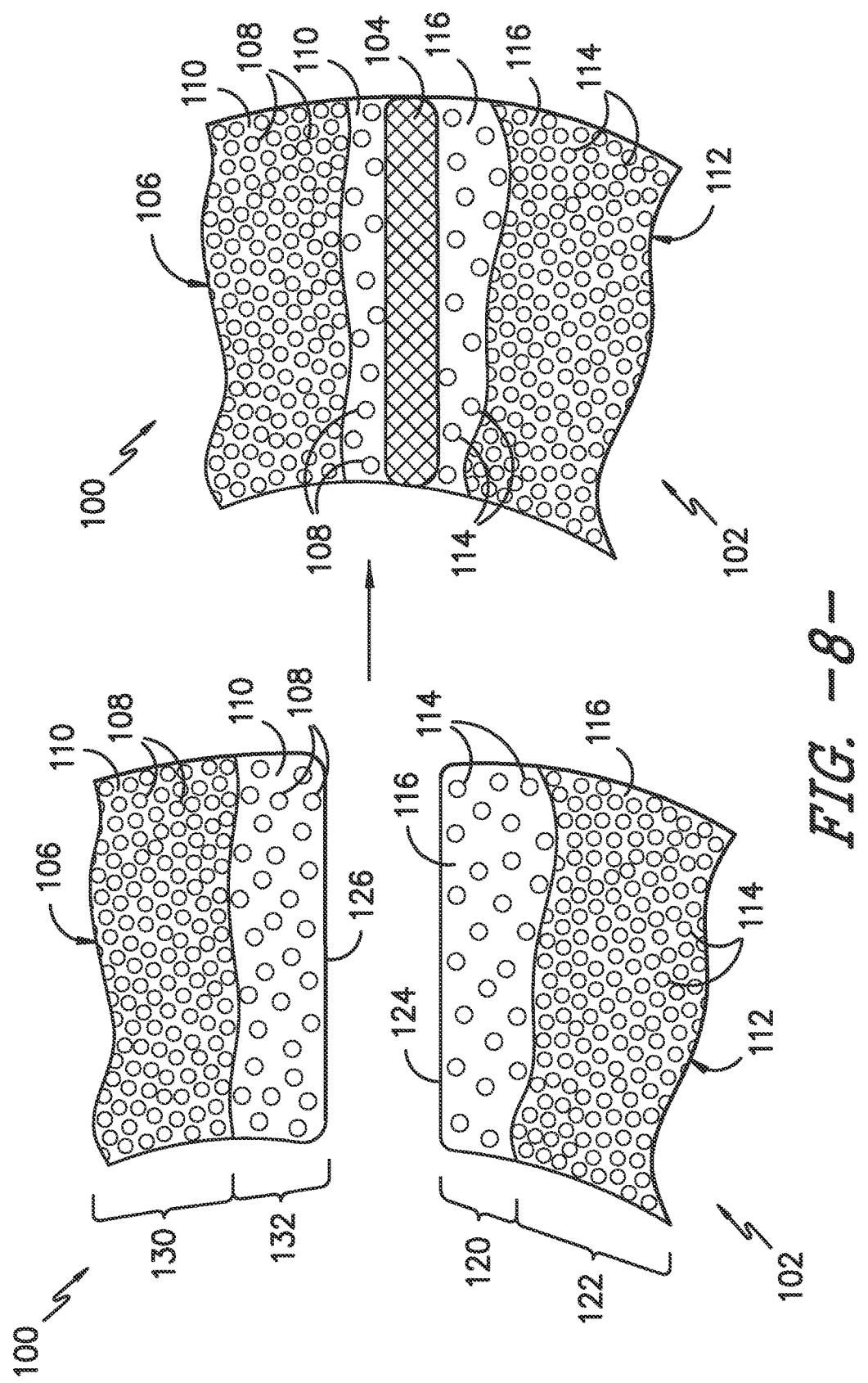
FIG. -8-

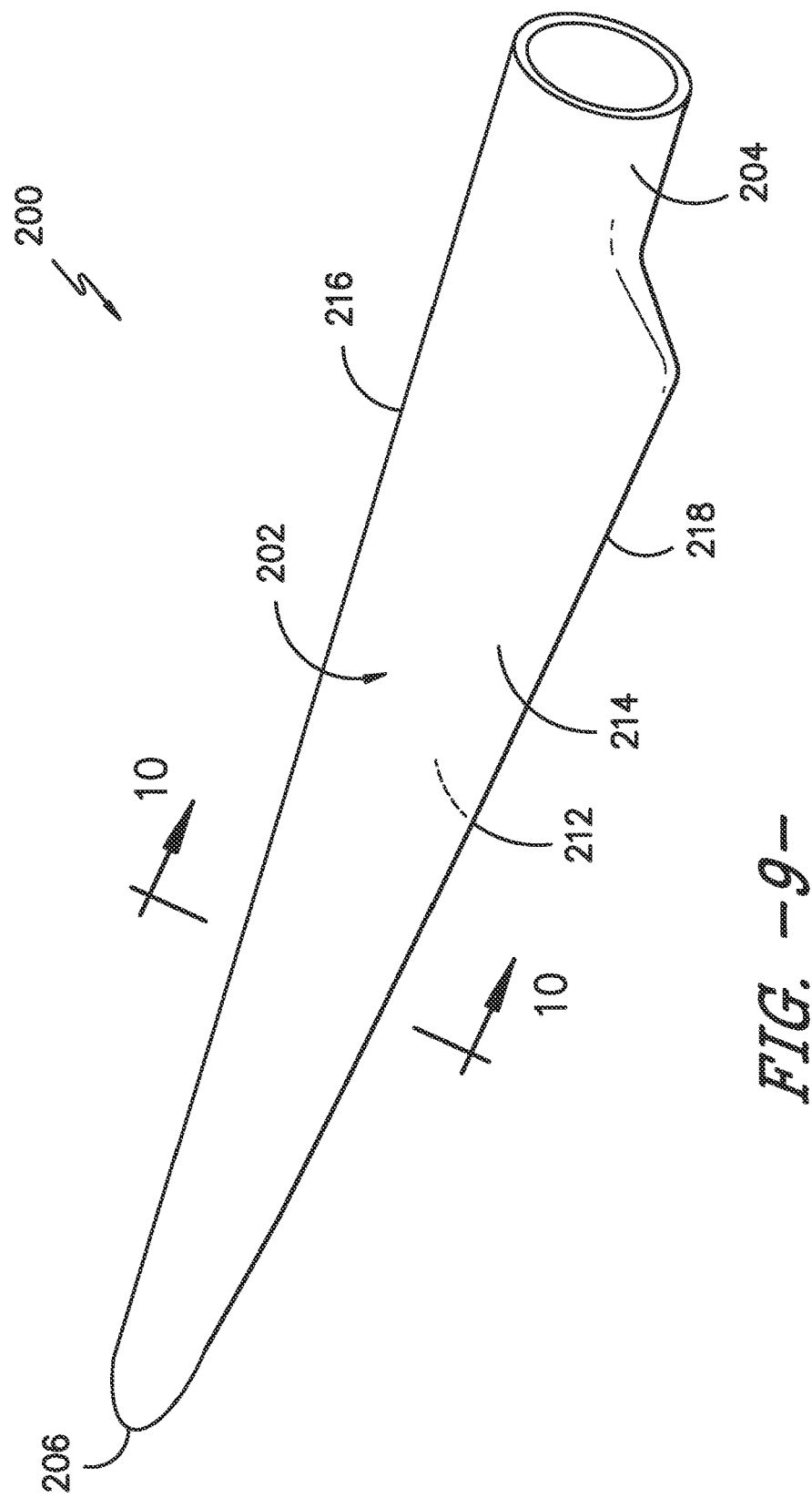
FIG. -9-

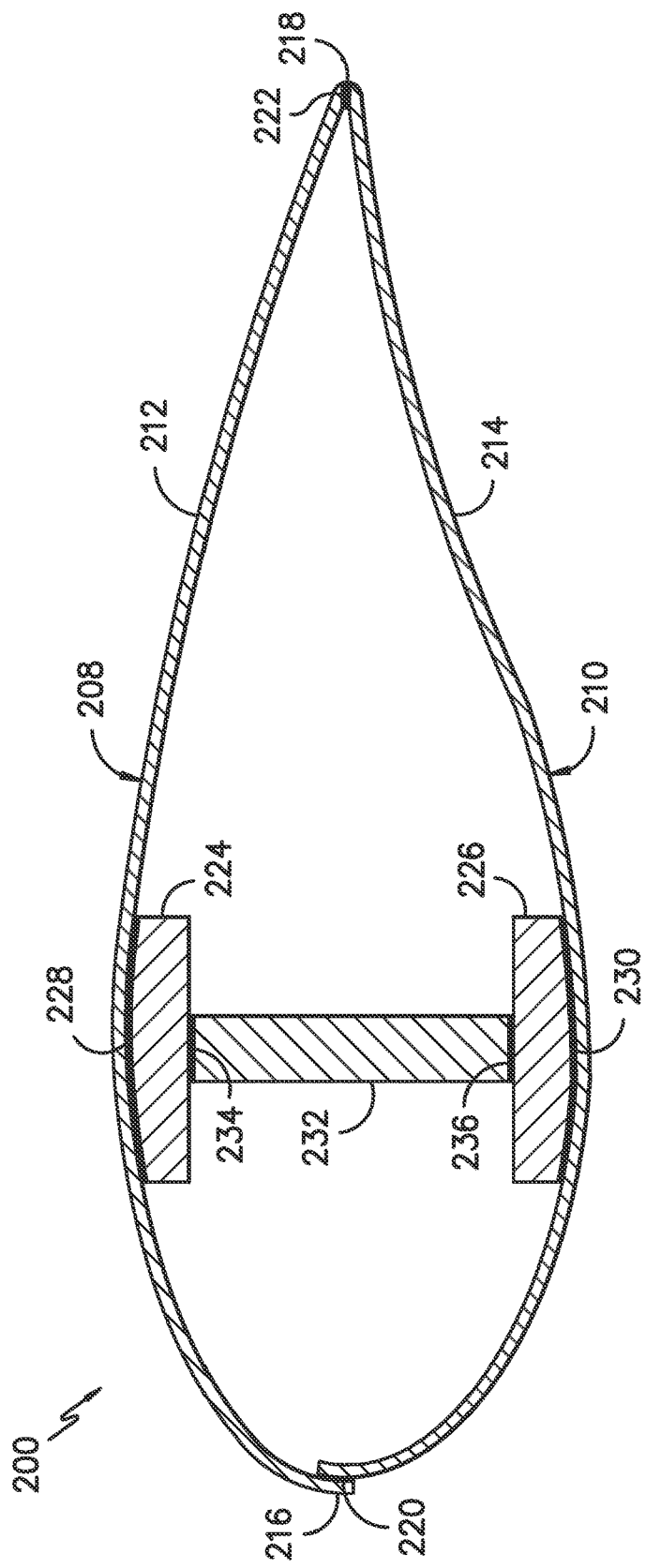
FIG. -10-

ROTOR BLADE COMPONENTS HAVING VARYING FIBER DENSITY REGIONS

FIELD OF THE INVENTION

The present subject matter generally relates to wind turbine rotor blades and, more particularly, to rotor blade components having varying fiber density regions to accommodate coupling the components together via thermoplastic welding.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Each rotor blade of a wind turbine typically includes a suction side shell and a pressure side shell formed using molding processes that are subsequently bonded together via adhesives at bond lines along the leading and trailing edges of the blade. The pressure and suction side shells are relatively lightweight and have structural properties (e.g., stiffness, buckling resistance and strength) that are not configured to withstand the bending moments and other loads exerted on the rotor blade during operation. Thus, to increase the stiffness, buckling resistance and strength of the rotor blade, the shells are typically reinforced using one or more structural components (e.g. opposing spar caps with a shear web configured therebetween) that engage the pressure and suction side inner surfaces of the shell halves. The spar caps are typically constructed of various materials, including but not limited to fiber-reinforced laminate composites including a thermoset resin. The shells of the rotor blade are generally built around the spar caps by stacking layers of fiber fabrics in a shell mold. The layers are then typically infused together, e.g. with a thermoset resin.

Such rotor blades, however, are not without issues. For example, the bond lines of typical rotor blades are generally formed by applying a suitable bonding paste or adhesive along the bond line with a minimum designed bond width between the shell members. These bonding lines are an important design constraint of the blades as a significant number of turbine blade field failures occur at the bond-line. Separation of the bond line along the leading and/or trailing edges of an operational turbine blade can result in a catastrophic failure and damage to the wind turbine.

In addition, the methods used to manufacture the rotor blades and/or structural components thereof can be difficult to control, defect prone, and/or highly labor intensive due to handling of the dry fabrics and the challenges of infusing large laminated structures. Moreover, as rotor blades continue to increase in size, conventional manufacturing methods continue to increase in complexity as the blade halves are typically manufactured using opposing mold halves that must be large enough to accommodate the entire length of the rotor blade. As such, joining the large blade halves can be highly labor intensive and more susceptible to defects.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade. However, known joint designs for connecting the blade segments together typically have a variety of disadvantages. For example, many known joint designs require complex interconnecting components and do not provide for sufficient alignment of the blade segments, thereby increasing the amount of time needed to assemble the blade segments. In addition, segmented blades are typically heavier than conventional blades due to the additional joints and/or related parts.

Thus, the art is continuously seeking new and improved rotor blades and related assembly methods that address one or more of the aforementioned issues. Accordingly, improved wind turbine rotor blade components having varying fiber density regions that can be easily and effectively assembled would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade for a wind turbine. The rotor blade may generally include a first blade component formed from a first fiber-reinforced composite including a plurality of fibers and a first thermoplastic resin material and a second blade component configured to be coupled to the first blade component at a joint interface. The second blade component may be formed from a second fiber-reinforced composite including a plurality of fibers and a second thermoplastic resin material. The second fiber-reinforced composite may include a low fiber region disposed at the joint interface and a high fiber region spaced apart from the joint interface, with the low fiber region having a fiber-weight fraction that is less than a fiber-weight fraction of the high fiber region. In addition, the first thermoplastic resin material of the first fiber-reinforced composite may be welded to the second thermoplastic resin material contained within the low fiber region of the second thermoplastic composite to form a welded joint at the joint interface between the first blade component and the second blade component.

In another aspect, the present subject matter is directed to a rotor blade for a wind turbine. The rotor blade may generally include a first blade component formed from a first fiber-reinforced composite including a plurality of fibers and a first thermoplastic resin material, wherein the first fiber-reinforced composite includes a first low fiber region defining a first exterior surface of the first blade component and a first high fiber region spaced apart from the first exterior surface. The first low fiber region may have a fiber-weight fraction that is less than a fiber-weight faction of the first high fiber region. The rotor blade may also include a second blade component configured to be coupled to the first blade component at a joint interface. The second blade component may be formed from a second fiber-reinforced composite including a plurality of fibers and a second thermoplastic resin material, wherein the second fiber-reinforced composite includes a second low fiber region defining a second exterior surface of the second blade component and a second high fiber region spaced apart from the second exterior surface. The second low fiber region may have a fiber-weight fraction that is less than a fiber-weight faction of the second high fiber region. In addition, the first thermoplastic resin material contained within the first low fiber region of the first fiber-reinforced composite may be welded to the second thermoplastic resin material contained within the second low fiber region of the second thermoplastic composite to form a welded joint at the joint interface defined between the first and second exterior surfaces of the first and second blade components.

In a further aspect, the present subject matter is directed to a method for assembling a rotor blade. The method may generally include positioning a first blade component adjacent to a second blade component at a joint interface to be defined between the first and second blade components, wherein the first blade component is formed from a first fiber-reinforced composite including a plurality of fibers and a first thermoplastic resin material and the second blade component is formed from a second fiber-reinforced composite including a plurality of fibers and a second thermoplastic resin material. The second fiber-reinforced composite may include a low fiber region disposed at the joint interface and a high fiber region spaced apart from the joint interface, with the low fiber region having a fiber-weight fraction that is less than a fiber-weight fraction of the high fiber region. In addition, the method may include welding a portion of the first thermoplastic resin material of the first fiber-reinforced composite to a portion of the second thermoplastic resin material contained within the low fiber region of the second thermoplastic composite to form a welded joint at the joint interface between the first blade component and the second blade component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a wind turbine in accordance with aspects of the present subject matter;

FIG. 2 illustrates a perspective, assembled view of one embodiment of a modular rotor blade in accordance with aspects of the present subject matter;

FIG. 3 illustrates a perspective, exploded view of the modular rotor blade shown in FIG. 2;

FIG. 4 illustrates a cross-sectional view of the modular rotor blade shown in FIG. 2 taken about line 4-4, particularly illustrating various joints that may be formed at the interface(s) defined between adjacent blade components of the modular rotor blade;

FIG. 5 illustrates another cross-sectional view of the modular rotor blade shown in FIG. 2 taken about line 5-5, particularly illustrating various other joints that may be formed at the interface(s) defined between adjacent blade components of the modular rotor blade;

FIG. 6 illustrates a partial, perspective view of one embodiment of a suitable fiber-reinforced composite that may be used to form any of the blade components described herein;

FIG. 7 illustrates a simplified, schematic view of one embodiment of portions of two blade components before and after such components have been welded together, particularly illustrating a low fiber region defining an exterior surface one of the blade components to facilitate welding the components together;

FIG. 8 illustrates a simplified, schematic view of another embodiment of portions of two blade components before and after such components have been welded together, particularly illustrating low fiber regions defining exterior surfaces of both of the blade components to facilitate welding the components together;

FIG. 9 illustrates a perspective view of one embodiment of a non-modular rotor blade in accordance with aspects of the present subject matter; and FIG. 10 illustrates a cross-sectional view of the rotor blade shown in FIG. 9 taken about line 10-10, particularly illustrating various joints that may be formed at the interface(s) defined between adjacent blade components of the rotor blade.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to wind turbine rotor blade components having varying fiber density regions. Specifically, in several embodiments, the blade components described herein may be formed from fiber-reinforced composites including a thermoplastic resin material. To allow adjacent blade components to be coupled to one another at the interface defined between such components via thermoplastic welding, one or both of the blade components may include a low fiber density region at or adjacent to the interface. As such, a sufficient amount of thermoplastic material may be located at the interface for forming a welded joint between the components. Additionally, in locations at which the blade component(s) is not configured to be coupled to another blade component(s), the blade component(s) may include a high fiber density region(s) to provide the component with desired structural properties, such as increased stiffness.

For example, in one embodiment, a first blade component may be formed primarily from a thermoplastic-based fiber-reinforced composite that includes one or more high fiber regions and one or more low fiber regions, with the low fiber region(s) being located at one or more anticipated joint locations for the blade component. In such an embodiment, a second blade component formed primarily from a compatible thermoplastic-based fiber-reinforced composite may be welded to the first blade component at one or more of the anticipated joint locations. Due to the low fiber region(s) formed at the anticipated joint locations(s), the additional thermoplastic material contained within the first blade component at such regions may serve as a donor material for the performing the welding operation, thereby allowing for a secure, welded joint(s) to be formed between the components at the joint location(s).

It should be appreciated that the thermoplastic resin materials described herein differ from conventional thermoset resin materials. Specifically, as used herein, thermoplastic materials generally encompass a plastic material or polymer that is reversible in nature. For example, thermoplastic materials typically become pliable or moldable when heated to a certain temperature and return to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), polyethylene terephthalate glycol-modified (PETG), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to, polyolefins, polyamides, fluoropolymer, ethyl-methyl acrylate, polyesters, polycarbonates, and/or acetals. More specifically, example semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. In contrast, thermoset materials generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies and/or similar materials.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIGS. 2-5, several views of a modular rotor blade 22 and/or components of a modular rotor blade 22 that may be utilized with the wind turbine 10 shown in FIG. 1 are illustrated in accordance with aspects of the present subject matter. Specifically, FIG. 2 illustrates an assembled, perspective view of the modular rotor blade 22 and FIG. 3 illustrates an exploded view of the rotor blade 22 shown in FIG. 2. Additionally, FIGS. 4 and 5 illustrate cross-sectional views of the rotor blade 22 shown in FIG. 2 taken about lines 4-4 and 5-5, respectively.

As shown, the rotor blade 22 has a modular configuration including a plurality of blade sections 24, 26, 28, 30, 32, 34 configured to be coupled together to form a complete rotor blade. For instance, in the illustrated embodiment, the rotor blade 22 includes a pre-formed blade root section 24, a pre-formed blade tip section 26 disposed opposite the blade root section 24 and a plurality of intermediate blade segments 28, 30, 32, 34 configured to be arranged between the blade root section 24 and the blade tip section 26 along a longitudinal axis 36 (FIG. 2) of the rotor blade 22. The blade root section 24 may generally be configured to define or form a blade root or root end 38 for coupling the rotor blade 22 to the hub 20 (FIG. 1) of the wind turbine 10. Similarly, the tip section 26 may generally define a blade tip or tip end 40 corresponding to the outermost portion of the rotor blade 22 along its longitudinal axis 36.

When assembled, the rotor blade 22 may generally define a substantially aerodynamic profile, such as by defining a symmetrical or cambered airfoil-shaped cross-section. For instance, as shown in FIGS. 4 and 5, the rotor blade 22 may define a pressure side 42 and a suction side 44 extending between leading and trailing edges 46, 48. Additionally, as particularly shown in FIG. 2, the assembled rotor blade 22 may generally have a span 50 defining the total length between the root end 38 and the tip end 40 of the blade 22 and a chord 52 defining the total length between the leading edge 46 and the trailing edge 48 of the blade 22. As is generally understood, the chord 52 may generally vary in length with respect to the span 50 as the rotor blade 22 extends from its root end 38 to its tip end 40.

As shown in FIG. 3, the blade root section 24 may generally include a root portion 54 and one or more continuous, longitudinal spar caps 56, 58 co-infused with the root portion 54, with the spar cap(s) 56, 58 generally extending outwardly from the root portion 54 in the spanwise direction of the rotor blade 22. The root portion 54 may extend lengthwise between the root end 38 of the blade root section 24 and an outboard end 60. Similarly, as shown in FIG. 3, the blade tip section 26 may generally include a tip portion 62 and one or more continuous, longitudinal spar caps 64, 66 co-infused with the tip portion 62, with the spar cap(s) 64, 66 generally extending outwardly from the tip portion 62 in the spanwise direction of the rotor blade 22. The tip portion 62 may extend lengthwise between an inboard end 68 and the tip end 40 of the blade tip section 26.

As indicated above, the rotor blade 22 may also include a plurality of intermediate blade segments 28, 30, 32, 34, 36 configured to be positioned between the root and tip sections 24, 26. For example, as shown in FIG. 3 and FIG. 4, the rotor blade 22 may include a plurality of leading edge segments 28 and a plurality of trailing edge segments 30 configured to be assembled between the blade root section 24 and the blade tip section 26 along the longitudinal axis 36 of the rotor blade 22. In such an embodiment, each leading edge segment 28 may be configured to define a spanwise section of the leading edge 46 of the rotor blade 22 and may include first and second side sections 70, 72 extending from the leading edge 46 so as to form portions of the pressure and suction sides 42, 44 of the rotor blade 22, respectively. Similarly, each trailing edge segment 30 may be configured to define a spanwise section of the trailing edge 48 of the rotor blade 22 and may include first and second side sections 74, 76 extending from the trailing edge 48 so as to form portions of the pressure and suction sides 42, 44 of the rotor blade 22, respectively. As such, to assemble the rotor blade 22, the side sections 70, 72 of each leading edge segment 28 may be configured to be coupled to the side sections 74, 76 of a corresponding trailing edge segment 30 at an interface defined between such components to form a spanwise section of the rotor blade 22 that includes complete pressure and suction sides 42, 44 extending between the leading and trailing edges 46, 48 of the blade 22. For instance, as particularly shown in FIG. 4, the side sections 70, 72, 74, 76 of the leading and trailing edge segments 28, 30 may be coupled together at pressure and suction side seams or joints 84, 85 that overlap the structural components of the rotor blade 22 (e.g., the spar caps 56, 58, 64, 66).

Moreover, as shown in FIGS. 3 and 5, in addition to the leading and trailing edge segments 28, 30, the rotor blade 22 may, in certain embodiments, also include at least one pressure side segment 32 and/or at least one suction side segment 34. In such embodiments, the pressure side segment(s) 32 may generally correspond to a spanwise section of the rotor blade 22 that extends between the leading and trailing edges 46, 48 so as to define the pressure side 42 of the blade 22. Similarly, the suction side segment(s) 34 may generally correspond to a spanwise section of the rotor blade 22 that extends between the leading and trailing edges 46, 48 so as to define the suction side 44 of the blade 22. As such, to assemble the rotor blade 22, each pressure side segment 32 may be coupled to a corresponding suction side segment 34 at the interface defined between such components at the leading and trailing edges 46, 48 of the rotor blade 22. For example, as particularly shown in FIG. 5, the pressure and suction side segments 32, 34 are coupled to one another at leading and trailing edge seams or joints 86, 87 formed at the leading and trailing edges 46, 48 of the rotor blade 22.

It should be appreciated that various other joints may be formed between the various adjacent blade segment/sections of the modular rotor blade 22. For example, as shown in FIG. 2, a joint(s) 88 may be formed at the interface(s) defined between the outboard end 60 of the root portion 54 of the blade root section 24 and the adjacent leading and trailing edge segments 28, 30. Similarly, a joint(s) 89 may be formed at the interface(s) defined between each pair of adjacent leading edge segments 28 and/or trailing edge segments 30. Moreover, as shown in FIG. 2, a joint(s) 90 may be formed at the interface(s) defined between the leading and trailing edge segments 28, 30 and each pressure side segment 32 and/or trailing edge segment 34. Similarly, a joint(s) 91 may be formed at the interface defined between the inboard end 68 of the tip portion 62 of the blade tip section 26 and the adjacent pressure and suction side segments 32, 34.

Referring still to FIGS. 2-5, the rotor blade 22 may also include one or more structural components configured to provide increased stiffness, buckling resistance and/or strength to the rotor blade 22. For example, as indicated above, the blade root section 24 may include opposed longitudinally extending spar caps 56, 58 that are configured to extend outwardly from the root portion 54 of the blade root section 24 towards the blade tip section 26 along the spanwise direction of the rotor blade 22. Similarly, the blade tip section 26 may include two opposed, longitudinally extending spar caps 64, 66 configured to extend inwardly from the tip portion 62 of the blade tip section 26 towards the blade root section 24 along the spanwise direction of the rotor blade 22. In such embodiments, the blade root section 24 and the blade tip section 26 may be configured to be joined to one another via their respective spar caps 56, 58, 64, 66. For instance, in several embodiments, the outer ends of each blade root spar cap 56, 58 may be configured to be coupled to the inner ends of the corresponding blade tip spar cap 64, 66 at a spar cap joint 78 (FIG. 2) so as to couple the blade root section 24 to the blade tip section 26.

Additionally, the spar caps 56, 58, 64, 66 may be coupled to the intermediate blade segment(s) disposed immediately adjacent to the spar caps 56, 58, 64, 66 along the pressure and suction sides 42, 44 of the rotor blade 22. For example, as shown in FIG. 4, the blade root spar cap 56 extending along the pressure side 42 of the rotor blade 22 may be coupled to the leading and trailing edge segments 28, 30 at the interface defined between such components so as to form one or more first blade/spar joints 92 while the blade root spar cap 58 extending along the suction side 44 of the rotor blade 22 may be coupled to the leading and trailing edge segments 28, 30 at the interface defined between such components so as to form one or more second blade/spar joints 93. Similarly, as shown in FIG. 5, the blade tip spar cap 64 extending along the pressure side 42 of the rotor blade 22 may be coupled to the pressure side segment 32 at the interface defined between such components so as to form one or more third blade/spar joints 94 while the blade tip spar cap 66 extending along the suction side 44 of the rotor blade 22 may be coupled to the suction side segment 34 at the interface defined between such components so as to form one or more fourth blade/spar joints 95.

As shown in the illustrated embodiment, the rotor blade 22 may also include one or more shear webs 80, 81 configured to extend between the opposed blade root spar caps 56, 58 and/or between the opposed blade tip spar caps 64, 66. Specifically, as shown in FIG. 4, the rotor blade 22 may include a first shear web 80 configured to be coupled directly between the blade root spar caps 56, 58 such that a first shear web joint 96 is formed at each interface between the shear web 80 and one of the spar caps 56, 58. Similarly, as shown in FIG. 5, the rotor blade 22 may include a second shear web 81 configured to be coupled directly between the blade tip spar caps 64, 66 such that a second shear web joint 97 is formed at each interface between the shear web 81 and one of the spar caps 64, 66.

It should be appreciated that the rotor blade 22 may also include one or more additional structural components. For instance, as shown in FIGS. 2 and 3, the rotor blade 22 may include an auxiliary structural component 82 configured to be coupled to the root portion 54 of the blade root section 24 and extend outwardly therefrom in the spanwise direction of the rotor blade 22 at a location generally adjacent to the trailing edge 48 of the blade 22.

It should also be appreciated that, in alternative embodiments, the rotor blade 22 may have any other suitable modular configuration, including having any other suitable number and/or configuration of blade sections and/or blade segments. For instance, in one embodiment, the rotor blade 22 may only include leading and trailing edge segments 28, 30 positioned between the blade root and tip sections 24, 26. In another embodiment, the rotor blade 22 may only include pressure and suction side segments 32, 34 positioned between the blade root and tip sections 24, 26.

In several embodiments, each blade component of the modular rotor blade 22 described above may be formed from a fiber-reinforced composite having a plurality of fibers surrounded by a suitable matrix material. For example, FIG. 6 illustrates a partial, perspective view of an example fiber-reinforced composite 71 that may be used to form any of the blade components described herein. As shown, the laminate composite 71 may include a plurality of fibers 73 (e.g., glass or carbon fibers) surrounded by or joined together via a resin matrix material 75. In the illustrated embodiment, the fibers 73 are unidirectional and, thus, are all oriented in a common fiber direction 77. However, in other embodiments, the fibers 73 may be oriented in two or more directions.

As indicated above, in several embodiments, the resin matrix material 75 may correspond to a thermoplastic resin material, which may allow adjacent blade components of a rotor blade to be welded together at the interface defined between the components via thermoplastic welding. In accordance with aspects of the present subject matter, to improve the weldability of the blade components, one or both of the blade components being welded together at a given joint interface may include a region of low fiber density located at or adjacent to such joint interface, thereby providing additional thermoplastic material for welding the components to one another.

Referring now to FIG. 7, a simplified view of one embodiment of first and second blade components 100, 102 having one or more low fiber regions to facilitate coupling the blade components 100, 102 together via welding is illustrated in accordance with aspects of the present subject matter. As shown in FIG. 7, the first and second blade components 100, 102 may be welded together so as to form a welded joint (indicated by the cross-hatched area 104) at the interface defined between the blade components 100, 102. In several embodiments, the first blade component 102 may correspond to any suitable blade component, such as one of the blade components described above with reference to FIGS. 2-5 (e.g., the blade root section 24, blade tip section 26, one of the leading edge segments 28, one of the trailing edge segments 30, one of the pressure side segments 32, one of the suction side segments 34, one of the spar caps 56, 58, 64, 66 or one of the shear webs 80, 81). In such embodiments, the second blade component 102 may generally correspond to a blade component that is configured to be positioned adjacent to and/or otherwise coupled to the first blade component 100 at an interface defined between such blade components 100, 102. Thus, it should be appreciated that the welded joint 104 shown in FIG. 7 may generally correspond to any suitable attachment interface or joint of a rotor blade, such as any of the various joints 78, 84, 85, 86, 87, 88, 89, 90, 91, 92, 93, 94, 95, 96, 97 described above. For instance, if the first blade component 100 corresponds to the leading edge segment 28 shown in FIG. 2 through which line 4-4 passes, the second blade component 102 may correspond to the blade root section 24 (with the joint 104 corresponding to the joint 88 shown in FIG. 2), the adjacent trailing edge segment 30 (with the joint 104 corresponding to the joint 85 shown in FIG. 2), the adjacent leading edge segment 28 (with the joint 104 corresponding to the joint 89 shown in FIG. 2) or one of the adjacent spar caps 56, 58 (with the joint 104 corresponding to one of the joints 92, 93 shown in FIG. 4).

As shown in FIG. 7, the first blade component 100 is formed from a first fiber-reinforced composite 106 including a plurality of fibers 108 and a first thermoplastic resin material 110. Similarly, as shown in FIG. 7, the second blade component 102 is formed from a second fiber-reinforced composite 112 including a plurality of fibers 114 and a second thermoplastic resin material 116. In several embodiments, the first thermoplastic resin material 110 may be the same as the second thermoplastic resin material 116. For example, each of the thermoplastic resin materials 110, 116 may include the same resin chemistry. Alternatively, the first and second thermoplastic resin materials 110, 116 may correspond to differing resin materials that are otherwise capable of being welded together to form a secure welded joint. For example, certain compatible thermoplastic resin materials may be welded together even though the thermoplastic resin materials have differing resin chemistries.

In several embodiments, to allow for an improved welded joint 104 to be formed between the first and second blade components 100, 102, one or both of the blade components 100, 102 may include a low fiber region positioned at or adjacent to the anticipated location for the joint 104. This "low fiber region" may have a lower fiber-weight fraction and, thus, a higher concentration of thermoplastic resin material, thereby allowing all or a portion of the resin material contained within the low fiber region to be used as donor material for forming the welded joint 104.

For example, as shown in FIG. 7, the second fiber-reinforced composite 112 includes both a low fiber region 120 positioned at the location of the joint interface to be defined between the first and second blade components 100, 102 and a high fiber region 122 spaced apart from the joint interface. Specifically, in several embodiments, the low fiber region 120 may be positioned at an exposed surface or location on the second blade component 102 at which such blade component 102 is configured to be coupled to the first blade component 100. For instance, as shown in FIG. 7, the low fiber region 120 defines an exterior surface 124 of the second blade component 102 that is configured to be coupled to a corresponding exterior surface 126 of the first blade component 100. As such, when coupling the first and second blade components 100, 102 together, the corresponding exterior surfaces 124, 126 may be placed adjacent to one another to form a joint interface between the blade components 100, 102. Thereafter, the first and second blade components 100, 102 may be welded together at the joint interface to form the welded joint 104.

In general, the low fiber region 120 may have a fiber-weight fraction that is less than the fiber-weight fraction of the high fiber region 122. As used herein, the term "fiber-weight fraction" generally refers to the percentage of fibers by weight contained within a given volume of a fiber-reinforced composite. For instance, to calculate the fiber-weight fraction of the low fiber region 120, the weight of all of the fibers 114 contained within the low fiber region 120 may be divided by the total weight of the low fiber region 120 (i.e., the weight of both the fibers 114 and the thermoplastic resin material 116 contained within the low fiber region 120), with the resulting value being multiplied by 100 to obtain the percentage.

In several embodiments, the fiber-weight faction of the low fiber region 120 may range from greater than zero to less than 65% while the fiber-weight faction of the high fiber region 122 may be equal to or greater than 65%. For instance, the low fiber region 120 may have a fiber-weight faction that ranges from greater than zero to less than 60%, such as a range from greater than zero to less than 50% or greater than zero to less than 40% or greater than zero to less than 25% or greater than zero to less than 15% and any other subranges therebetween. In a particular embodiment, the low fiber region 120 may have a fiber-weight faction that ranges from greater than zero to less than 10%, such as a range from greater than zero to less than 5% or greater than zero to less than 2% or greater than zero to less than 1% and any other subranges therebetween. Similarly, in a particular embodiment, the high fiber region 122 may have a fiber-weight faction that is greater than about 70%, such as a fiber-weight faction ranging from 70% to about 85% or a fiber-weight faction ranging from 70% to about 80%.

It should be appreciated that, although the second blade component 102 is shown in FIG. 7 as including a single low fiber region 120, the second blade component 102 may include multiple low fiber regions 120, such as by including a low fiber region 120 at each welded joint to be defined between the second blade component 102 and an adjacent blade component. For instance, if the second blade component 102 corresponds to the trailing edge segment 30 shown in FIG. 2 through which line 4-4 passes, the second blade component 102 may include low fiber regions 120 at the exposed surfaces or locations corresponding to the joint(s) to be formed between the second blade component 102 and the blade root section 24 (e.g., at joint 88 shown in FIG. 2), between the second blade component 102 and the adjacent leading edge segment 28 (e.g., at joint 85 shown in FIG. 2), between the second blade component 102 and the adjacent trailing edge segment 30 (e.g., at joint 89 shown in FIG. 2) and/or between the second blade component 102 and one of the adjacent spar caps 56, 58 (e.g., at one of the joints 92, 93 shown in FIG. 4).

Additionally, it should be appreciated that, although a given blade component may include multiple low fiber regions 120, the majority of the fiber-reinforced composite forming such blade component may correspond to its high fiber region. For instance, in the embodiment shown in FIG. 7, the second fiber-reinforced composite 112 may be formed primarily from its high fiber region 122, with the low fiber region(s) 120 corresponding to less than 10% by weight of the fiber-reinforced composite 112 (as determined by dividing the combined weight of all of the low fiber regions 120 of the second fiber-reinforced composite 112 by the total weight of the composite 112). Specifically, in several embodiments, the low fiber region(s) 120 of the second fiber-reinforced composite 112 may correspond to less than 5% by weight of the fiber-reinforced composite 112, such as less than 4% by weight of the fiber-reinforced composite or less than 2% by weight of the fiber-reinforced composite.

As shown in FIG. 7, when the second blade component 102 includes a low fiber region 120 at the joint interface to be defined between the blade components 100, 102, the portion of the exterior surface 126 of the first fiber-reinforced composite 106 located at the joint interface may, in several embodiments, be defined by a high fiber region 130. In such embodiments, the high fiber region 130 of the first fiber-reinforced composite 106 may have the same or a similar fiber-weight faction as that of the high fiber region 122 of the second fiber-reinforced composite 112. For example, the high fiber region 130 of the first fiber-reinforced composite 106 may have a fiber-weight faction of equal to or greater than 65%, such as fiber-weight faction ranging from 65% to about 85%. Alternatively, as will be described below with reference to FIG. 8, the first blade component 100 may also include a low fiber region positioned at the interface to be defined between the first and second blade components 100, 102.

It should be appreciated that the low fiber region(s) described herein may be formed and/or positioned along the exposed surface(s) of a blade component using any suitable means and/or methodology known in the art. For instance, in one embodiment, the manufacturing process for a given blade component may be controlled so that the corresponding fiber-reinforced composite includes low fiber regions at the anticipated joint locations for the component. This may be achieved, for example, by specifically tailoring the fiber concentration at the anticipated joint locations during the molding process, pultrusion process and/or other process used to form the blade component. Alternatively, the low fiber region(s) may be positioned along the exposed surface(s) of the blade component subsequent to the high fiber region of the blade component being formed. For instance, the low fiber region(s) may be separately applied or formed onto the pre-existing high fiber region of the blade component at the anticipated joint location(s), such as by applying a high resin content tape(s) at the anticipated joint location(s) to form the low fiber region(s) or by subsequently forming the low fiber region(s) using a hand lay-up process.

Referring now to FIG. 8, a simplified view of another embodiment of the first and second blade components 100, 102 described above is illustrated in accordance with aspects of the present subject matter. As shown in FIG. 8, unlike the embodiment described above, both the first and second components 100, 102 include a low fiber region positioned at the exposed surfaces at which the welded joint 104 is to be formed between the components 100, 102. Specifically, the second blade component 102 is generally configured the same as that described above with reference to FIG. 7. However, the first fiber-reinforced composite 106 includes a low fiber region 132 forming the exterior surface 126 of the first blade component 100 such that the high fiber region 130 of the first fiber-reinforced component 106 is spaced apart from such exterior surface 126. As such, when coupling the first and second blade components 100, 102 together, the exterior surfaces 124, 126 defined by the low fiber regions 120, 132 of the blade components 100, 102 may be placed adjacent to one another to form a joint interface between the components 100, 102. Thereafter, the first and second blade components 100, 102 may be welded together at the joint interface to form the corresponding welded joint 104.

It should be appreciated that, in the embodiment shown in FIG. 8, the low and high fiber regions 132, 130 of the first fiber-reinforced composite 106 may be configured the same as or similar to the low and high fiber regions 120, 122 of the second fiber-reinforced composite 112. For instance, the fiber-weight faction of the low fiber region 132 of the first fiber-reinforced composite 106 may range from greater than zero to less than 65% while the fiber-weight faction of the high fiber region 130 of the first fiber-reinforced composite 106 may be equal to or greater than 65%. For instance, the low fiber region 132 may have a fiber-weight faction that ranges from greater than zero to less than 60%, such as a range from greater than zero to less than 50% or greater than zero to less than 40% or greater than zero to less than 25% or greater than zero to less than 15% and any other subranges therebetween. In a particular embodiment, the low fiber region 132 may have a fiber-weight faction that ranges from greater than zero to less than 10%, such as greater than zero to less than 5% or greater than zero to less than 2% or greater than zero to less than 1% (including a fiber-weight fraction of zero) and any other subranges therebetween. Similarly, in a particular embodiment, the high fiber region 130 may have a fiber-weight faction that is greater than about 70%, such as a fiber-weight faction ranging from 70% to about 85% or a fiber-weight faction ranging from 70% to about 80%.

Similarly, it should be appreciated that the low fiber regions 120, 132 of the first and second fiber-reinforced composites 106, 112 may, in one embodiment, have the same fiber-weight fraction. Alternatively, the low fiber regions 120, 132 may have differing fiber-weight fraction. For instance, the low fiber region 132 of the first fiber-reinforced composite 106 may have a fiber-weight fraction that is less than or greater than the fiber-weight fraction of the low fiber region 120 of the second fiber-reinforced composite 112.

It should also be appreciated that, although the present subject matter has generally been described herein with reference to welding blade components of a modular rotor blade together, the subject matter may also be utilized to weld blade components of a conventional (or non-modular) rotor blade together. For instance, FIGS. 9 and 10 illustrate one embodiment of a non-modular rotor blade 200. Specifically, FIG. 9 illustrates a perspective view of the rotor blade 200 and FIG. 10 illustrates a cross-sectional view of the rotor blade 200 shown in FIG. 9 taken about line 10-10.

As shown, the rotor blade 200 includes a body shell 202 extending lengthwise or spanwise between a blade root 204 and an opposite blade tip 206, with the blade root 204 being configured to be coupled to the hub 20 (FIG. 1) of a corresponding wind turbine. As is generally understood, the body shell 202 may be formed from two separate shells, namely a pressure side shell 208 (FIG. 10) and a suction side shell 210 (FIG. 10). In such an embodiment, the pressure side shell 208 may generally be configured to define the pressure side 212 of the rotor blade 200 and the suction side shell 210 may generally be configured to define the suction side 214 of the rotor blade 200, with the pressure and suction sides shells 208, 210 being configured to be joined together at leading and trailing edges 216, 218 of the rotor blade. For instance, as shown in FIG. 10, a first edge joint 220 may be defined between the pressure and suction side shells 208, 210 at the leading edge 216 of the blade 200 and a second edge joint 222 may be defined between the pressure and suction side shells 208, 210 at the trailing edge 218 of the blade 200.

Additionally, the rotor blade 200 may also include one or more structural components. For instance, as shown in FIG. 10, the rotor blade 200 includes two longitudinally extending spar caps 224, 226 that are configured to extend spanwise along the pressure and suction side shells 208, 210 between the blade root 204 and the blade tip 206. In such an embodiment, a first blade/spar joint 228 may be defined between the pressure side spar cap 224 and the pressure side shell 208 and a second blade/spar joint 230 may be defined between the suction side spar cap 226 and the suction side shell 210. Moreover, the rotor blade 200 may also include a shear web(s) 232 extending between the opposed spar caps 224, 226, with a first shear web joint 234 being defined between the shear web 232 and the pressure side spar cap 224 and a second shear web joint 236 being defined between the shear web 232 and the suction side spar cap 226.

In accordance with aspects of the present subject matter, the first blade component 100 described above with reference to FIGS. 7 and 8 may correspond to one of the blade components of the rotor blade 200 shown in FIGS. 9 and 10 (e.g., the pressure side shell 208, the suction side shell 210, one of the spar caps 224, 226 or the shear web 232. In such an embodiment, the second blade component 102 described above with reference to FIGS. 7 and 8 may correspond to a blade component that is configured to be positioned adjacent to and/or otherwise coupled to the first blade component 100 at an interface defined between such blade components. For instance, if the first blade component 100 corresponds to the pressure side shell 208, the second blade component 102 may correspond to the suction side shell 210 or the pressure side spar cap 224. Thus, in instances in which two of the adjacent blade components of the rotor blade 200 shown in FIGS. 9 and 10 are formed from fiber-reinforced composites including weldable thermoplastic resin materials, the various embodiments described herein may be utilized to form a secure welded joint between such adjacent components by providing one or more low fiber regions at the interface defined between the blade components.

It should be appreciated that the present subject matter is also directed to a method for assembling a rotor blade. In several embodiments, the method may include positioning a first blade component adjacent to a second blade component at a joint interface to be defined between the first and second blade components. As indicated above, in several embodiments, the first blade component 100 may formed from a first fiber-reinforced composite 106 including a plurality of fibers 108 and a first a first thermoplastic resin material 110 and the second blade component 102 may be formed from a second fiber-reinforced composite 112 including a plurality of fibers 114 and a second thermoplastic resin material 116, with the second fiber-reinforced composite 112 including a lower fiber region 120 disposed at the joint interface. In addition, the method may include welding a portion of the first thermoplastic resin material of the first fiber-reinforced composite to a portion of the second thermoplastic resin material contained within the low fiber region of the second thermoplastic composite to form a welded joint at the joint interface between the first blade component and the second blade component.

It should also be appreciated that the thermoplastic materials described herein may welded together using any suitable welding device, means and/or method known in the art. For instance, suitable thermoplastic welding methods may include, but are not limited to, thermal welding, resistive welding, infrared welding, ultrasonic welding and/or chemical welding. Thermal welding may be achieved, for example, by heating the thermoplastic materials using a heat lamp, a laser light source, a heated flow of fluid and/or any other suitable heating device (e.g., a heat blanket or other conductive heating source).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assembling a rotor blade, the method comprising:

positioning a first blade component formed from a first fiber-reinforced composite including a plurality of fibers and a first thermoplastic resin material relative to a second blade component formed from a second fiber-reinforced composite including a plurality of fibers and a second thermoplastic resin material, the second fiber-reinforced composite being formed with varying density fiber regions including both a low fiber region and a high fiber region, the low fiber region having a fiber-weight fraction that is less than a fiber-weight fraction of the high fiber region, the first blade component being positioned relative to the second blade component such that the low fiber region of the second blade component is positioned adjacent to the first blade component at an anticipated location of a joint interface to be defined between the first blade component and the second blade component; and welding a portion of the first thermoplastic resin material of the first fiber-reinforced composite to a portion of the second thermoplastic resin material contained within the low fiber region of the second thermoplastic composite to form a welded joint at the anticipated location of the joint interface between the first blade component and the second blade component, the high fiber region being spaced apart from the welded joint.

2. The method of claim 1, wherein the fiber-weight fraction of the low fiber region ranges from greater than zero to less than 65% and the fiber-weight fraction of the high fiber region is equal to or greater than 65%.

3. The method of claim 2, wherein the fiber-weight fraction of the low fiber region ranges from greater than zero to less than 60% and the fiber-weight faction of the high fiber region is greater than 70%.

4. The method of claim 1, wherein the fiber-weight fraction of the low fiber region ranges from greater than zero to less than 10%.

5. The method of claim 1, wherein the first fiber-reinforced composite is formed with varying density fiber regions including both a first low fiber region and a first high fiber region, the first low fiber region having a fiber-weight fraction that is less than a fiber-weight fraction of the first high fiber region, wherein positioning the first blade component and the second blade component relative to each other comprises positioning the first blade component and the second blade component relative to each other such that the low fiber region of the second blade component is positioned adjacent to the first low fiber region of the first blade component at the anticipated location of the joint interface to be defined between the first blade component and the second blade component.

6. The method of claim 5, wherein welding the portion of the first thermoplastic resin material of the first fiber-reinforced composite to the portion of the second thermoplastic resin material contained within the low fiber region of the second thermoplastic composite comprises welding a portion of the first thermoplastic resin material contained within the first low fiber region of the first fiber-reinforced composite to a portion of the second thermoplastic resin material contained within the low fiber region of the second thermoplastic composite to form the welded joint at the anticipated location of the joint interface between the first blade component and the second blade component.

7. The method of claim 1, wherein the first thermoplastic resin material is the same as the second thermoplastic resin material.

8. The method of claim 1, wherein the rotor blade corresponds to a modular rotor blade formed from a plurality of blade components, wherein the first blade component corresponds to a blade root section, a blade tip section, a leading edge segment, a trailing edge segment, a pressure side segment, a suction side segment, a spar cap or a shear web of the modular rotor blade and wherein the second blade component comprises a blade component of the modular rotor blade configured to be coupled to the first blade component at the joint interface.

9. The method of claim 1, wherein the first blade component comprises one of a pressure side shell, a suction side shell, a spar cap or a shear web of the rotor blade and the second blade component comprises a blade component of the rotor blade configured to be coupled to the first blade component at the joint interface.

10. The method of claim 1, wherein the low fiber region corresponds to less than 10% by weight of the second fiber-reinforced composite.

11. The method of claim 1, wherein the low fiber region corresponds to less than 5% by weight of the second fiber-reinforced composite.

12. The method of claim 1, wherein the second thermoplastic resin material contained within the low fiber region of the second fiber-reinforced composite is a donor material for forming the welded joint between the first blade component and the second blade component.

13. A blade component for a rotor blade assembly of a wind turbine, the blade component comprising:
a fiber-reinforced composite including a plurality of fibers and a thermoplastic resin material, the fiber-reinforced composite defining an outer surface, a portion of the outer surface at least partially defining the location of an anticipated joint interface for the rotor blade assembly, the fiber-reinforced composite further comprising:
a high fiber region; and
a low fiber region extending between the portion of the outer surface and the high fiber region such that a portion of the low fiber region is disposed at the location of the anticipated joint interface and the high fiber region is spaced apart from the anticipated joint interface,
wherein the low fiber region has a fiber-weight fraction that is less than a fiber-weight fraction of the high fiber region.

14. The blade component of claim 13, wherein the fiber-weight fraction of the low fiber region ranges from greater than zero to less than 65% and the fiber-weight faction of the high fiber region is equal to or greater than 65%.

15. The blade component of claim 14, wherein the fiber-weight fraction of the low fiber region ranges from greater than zero to less than 60% and the fiber-weight faction of the high fiber region is greater than 70%.

16. The blade component of claim 13, wherein the fiber-weight fraction of the low fiber region ranges from greater than zero to less than 10%.

17. The blade component of claim 13, wherein the blade component comprises one of a pressure side shell, a suction side shell, a spar cap or a shear web of the rotor blade assembly.

18. The blade component of claim 13, wherein the low fiber region corresponds to less than 10% by weight of the fiber-reinforced composite.

19. The blade component of claim 13, wherein the low fiber region corresponds to less than 5% by weight of the fiber-reinforced composite.

* * * * *